March 17, 1936.  F. E. HARTMAN  2,034,184
IRRADIATING APPARATUS
Filed Feb. 23, 1933
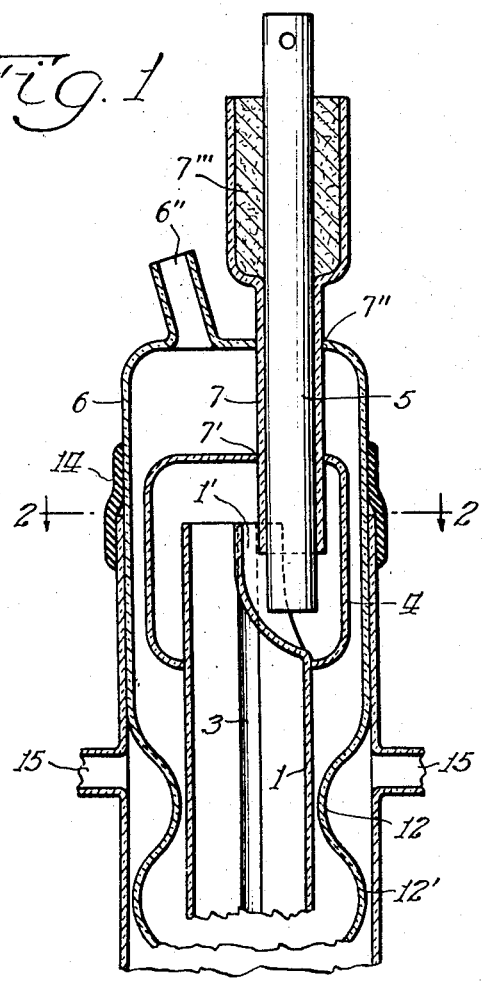
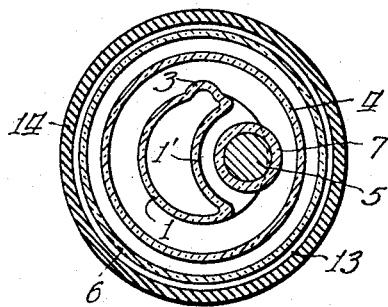
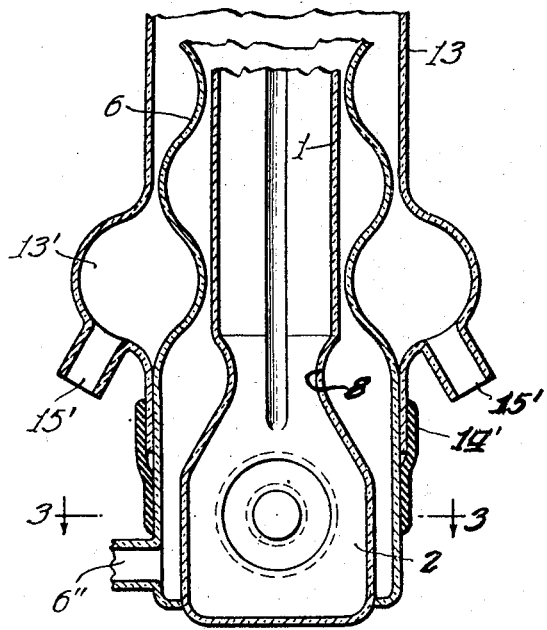
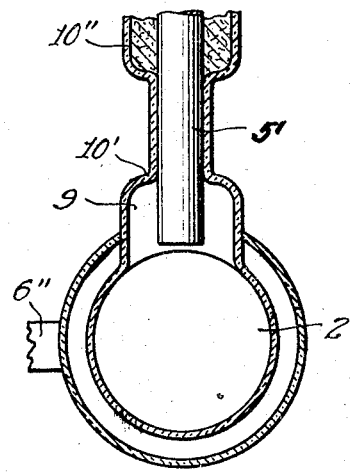
Inventor
Frank E. Hartman
By: Zabel Banning & Wells.

Patented Mar. 17, 1936

2,034,184

UNITED STATES PATENT OFFICE 2,034,184

IRRADIATING APPARATUS

Frank E. Hartman, Chicago, Ill., assignor to H. A. Brassert & Company, Chicago, Ill., a corporation of Illinois Application February 23, 1933, Serial No. 658,090

11 Claims. (Cl. 99—247)

This invention has for its object the provision of a method and an apparatus to facilitate the irradiation of fluids, wherein said fluids are exposed to an intense source of ultra-violet energy, in the absence of atmospheric air, and in a manner calculated to yield a maximum of effective absorption of ultra-violet energy, without resort to such devices as sprays, thin films of large area, etc., such as now generally employed where relatively opaque fluids are to be irradiated.

This invention contemplates also a method of increasing effective absorption of radiated energy by a fluid relatively opaque to the radiated energy which consists in repeatedly subjecting small quantities of the fluid to an intense source of radiation of the desired wave lengths and immediately mixing said quantities with other and as yet unexposed portions of the fluid.

This invention further comprehends certain novel constructional features with respect to the handling of electrodes, treating chamber, etc., so that an apparatus may be provided which readily lends itself to disassembly for purposes of cleaning and the like.

A further and prime object of the invention is the provision of a method and an apparatus designed to facilitate the irradiation of liquids relatively opaque to ultra-violet, employing a source of high actinic intensity, for the purpose of inducing or increasing therein anti-rachitic potency, having in mind the sterol containing oils, and more particularly milk.

Other objects and advantages will in part be pointed out and in part become obvious to those skilled in the art as these specifications and disclosures proceed.

In the present art, when liquids relatively opaque to ultra-violet are to be irradiated, recourse is had to spraying the liquid in a field of ultra-violet radiations, or the liquid may be made to pass under such radiations in the form of a very thin film. Either of these methods is troublesome, in the one case requiring special spraying apparatus and a very much enlarged treating chamber, wherein to produce the spray, whilst in the other the field of ultra-violet must be considerably protracted if a large body of fluid is to be treated, or recourse must be had to repeated recirculation. In the case of spraying, if the irradiation is to be carried out in the absence of atmospheric air, the spray chamber must either be flooded with an inert gas or evacuated, thus necessitating the employment of further accessory apparatus.

I have discovered a certain interesting fact with respect to the behaviour of liquids normally containing parent sterols, capable of assuming anti-rachitic potency upon ultra-violet irradiation, to wit: that when such liquids are exposed to an intense source of ultra-violet energy for a very short time, and then immediately admixed with a small volume of the same but unexposed liquid, and slightly agitated therewith, the sum total potency of the mixture is appreciably greater than the potency due to that portion of the mixture that was exposed, when the latter is assayed without admixture with a further volume of unexposed liquid.

As a specific example of this, I have subjected cotton seed oil in a film 1 mm. thick for a short period of time to irradiation from an intense source of ultra-violet, such as is produced by a water cooled mercury arc in quartz. The irradiation was carried out in the absence of air, and an anti-rachitic potency equivalent to 33 international units of vitamin D per gram of oil was induced. When a similar batch was likewise exposed in an identical manner but immediately mixed with an equal volume of un-exposed oil, the resulting potency of the mixture instead of assaying 16½ international units per gram, assayed in excess of 25, the unexposed oil was known to have absolutely no anti-rachitic potency. When the film thickness was increased from 1 mm. to 2 mm. and the irradiation carried out precisely as above, potency in excess of 33 units per gram was not obtained. This clearly indicates that the oil will re-radiate some of the light energy it has absorbed when mixed into a body of oil capable of receiving the energy, but will not transmit activating radiations to an appreciable depth of the oil, thus indicating that the absorption and re-radiation are surface phenomena, in the case of fluids normally opaque to ultra-violet. It is one of the objects of the apparatus of this invention to utilize this increase in effective absorption as will later be pointed out in detail.

Making no effort to delve into the actual mechanism of the conversion of parent sterols into substances displaying anti-rachitic potency, we may, however, say that the reaction is typically photo-chemical, and as such is subject, in general, to basic photo-chemical laws.

According to Windaus, it seems possible that in the case of ergosterol the conversion is not necessarily directly from ergosterol to the vitamin $D_2$ of the German or calciferol of the British, workers, but that intermediate products, designated by Windaus and his associates as "lumisterin" and "tachysterin" are formed which ultimately go over into the vitamin or anti-rachitic substance. With over irradiation, with respect to time, inactive sterols designated by Windaus, et al., as "Supersterin *i* and Supersterin *ii*" together with an unknown substance designated by them as "Substance 248" are formed, possibly through destruction of the vitamin proper. These inactive sterols, or "supersterins" differ markedly from the vitamin substance and the intermediate lumisterin and tachysterin, in that they no longer display double bonds in conjugated positions, and it is suggested by Windaus that they are condensation products and as such require considerable time for their formation.

In photo-chemical reactions, it is generally considered that a threshold exists, with respect to frequency or wave-length of the radiation, below which the reaction is not ordinarily initiated. This threshold value is generally determined by the energy, or so-called heat of formation, of the end product desired. This threshold, as to frequency or wave-length, is generally fixed by the energy quantum associated therewith. It is also a generalization, in photo-chemical considerations, that higher frequencies, or shorter wave-lengths, having greater quanta associated therewith, are available for serving energy to the reacting phase, and, as a direct consequence of their higher energy association, accomplish the reaction in a shorter time than would be required were energy employed sharply monochromatic at the threshold frequency. These generalizations are no more than is implied by the term, since in many specific cases of photo-chemical change, certain portions of the energy spectrum may be useful for supporting the reaction, whilst other, and frequently adjacent, regions of the spectrum may be specifically destructive of the desired end product.

Authorities are in fair agreement that the energy of conversion of ergosterol into vitamin D lies in the neighborhood of 90 large calories per mole. This energy is associated with a wave-length of about 3125 Å, and it was long considered that wave-lengths shorter than about 2900 Å (energy association about 97 large calories) were destructive to the vitamin formed. This contention falls down, however, in the face of controlled investigation, since even higher potencies may be obtained with the unfiltered spectrum of the mercury-quartz lamp, than are obtained when the spectrum is filtered substantially free from the shorter wave lengths. Study of the origin of this fallacy indicates a misunderstanding on the part of the earlier workers with vitamin D, mostly biologists, working with hot, or "high pressure" mercury quartz lamps, yielding very low efficiencies, as to actinic energy output, and more particularly so in the region of the shorter wave lengths. The low order of actinic energy emitted by the hot lamp necessitated so long an exposure as to induce the formation of the "supersterines" of Windaus, with consequent destruction of the vitamin. Since the condition was relieved somewhat by the introduction of filters for excluding the shorter wave lengths, it appears that the presence of the shorter wave lengths accelerates the formation of the supersterines, when the irradiation is carried out over a long period of time, but quite a different picture results when the irradiation is carried out with high intensities over a short period of time, hence the effect is, in fact, the result of time rather than directly one of wave length.

The water cooled mercury-quartz lamp, in contradistinction to the hot, or uncooled, mercury-quartz lamp, is much more efficient in the matter of actinic energy output, the order of increase in efficiency being approximately three-fold. This increase in efficiency is mostly evident in the shorter wave-length region of the spectrum; for instance, with the water cooled lamp, the line λ 1800 Å shows up clearly on a plate subjected to a 10 second exposure, whereas, with a hot lamp, having the same energy input, the spectrum of which was photographed with the same spectrogram apparatus, failed to give a distinct line below 2200-Å, even when the exposure was integrated over a period of twenty minutes. The line 1800 Å has an energy association of about 160 calories, whilst the line 2200 Å has an energy association of about 130 calories, thus with increased emission in the shorter wave lengths, the total energy of the spectrum is considerably increased. This difference in spectral characteristic is the result of the vapour pressure within the arc. With the hot lamp, the mercury vapour pressure is high, frequently above an atmosphere absolute, hence there is a great absorption of energy within the arc. With the cold lamp, the vapour pressure within the lamp may be below 25 mm. absolute, hence the emission efficiency is greatly increased.

Now, I have found that the repeated short exposure of a small quantity of a liquid, normally opaque to ultra-violet, in which anti-rachitic potency is to be increased or induced, to an intense source of ultra-violet, including wave lengths substantially down to 1800 Å, with the immediate admixture of the exposed portion of the liquid with other, and then unexposed, portions of the same liquid, results in a higher anti-rachitic potency than would be obtained with the same liquid when irradiated by the more conventional method of simple surface exposure.

Having described at some length both the objects and reason for the objects to be accomplished by the apparatus of this invention, a description of the apparatus is in order. A preferred embodiment of my invention is illustrated by the attached figures of which:

Fig. 1 represents a cross section of the apparatus in elevation

Fig. 2 is a plan section along the line 2—2 of Fig. 1

Fig. 3 represents a plan section of the lower mercury chamber on line 3—3 of Fig. 1, showing the lower electrode.

Referring to Fig. 1, the arc, or burner tube proper is indicated as 1, at the lower terminus of 1 is located the mercury reservoir or chamber 2, whilst the upper end of 1 terminates in an upper mercury reservoir or electrode chamber 4. This electrode chamber 4 is concentric with the burner tube, forming an annulus therewith, however, the upper lip of the burner tube is depressed on one side, forming an enlarged crescent as shown more clearly by Fig. 2, the crescent like depression being indicated as 1'. This depression or crescent serves to accommodate the iron electrode 5, which needs to be of relatively large cross-section, in order to conduct, without heating, the necessary current for a high intensity arc. It will be noted that the upper electrode chamber 4 is closed at the top, and through which enters the electrode sleeve tube 7, this tube being ring sealed through the top of 4 at the point 7'. It will also be noted that the tube 7 passes through the top of the water jacket tube 6, being ring sealed therethrough at the point 7''. The electrode sleeve tube 7 is also enlarged at its upper end, as indicated by 7''', the enlarged section forming an annulus with the electrode 5, said annulus being provided for accommodating a luting or cementing compound, which serves to secure the electrode 5 in place, and form a vacuum tight seal. As the luting or sealing compound employed for securing the electrode has a relatively low melting point it is important that it be protected against the heat of the arc. This is accomplished by surrounding a substantial portion of 7 by the water jacket, thus serving to keep 5 cool. A further protection against heating of 5 is assured through the complete surrounding of the electrode chamber 4 by the water in jacket 6. It will also be noted that the sleeve tube 7 extends down below the upper edge of the burner tube 1', so that when the upper mercury reservoir is full of mercury no iron of the electrode 5 is exposed, the mercury in the well of 4 serving to seal the iron electrode and the sleeve tube 7, and thus spluttering of the iron electrode under the influence of the discharge at low pressure is avoided.

The lower mercury chamber 2 is connected with the burner tube 1 through the constricted throat 8. Chamber 2 is also provided with a well section 9 (Fig. 3) adapted to receive the electrode 5', which enters through the tube 10, sealed to 9 at the point 10'. 10 is also provided with an enlarged section 10'', for accommodating sealing compound, as described for electrode 5 and tube 7. It will also be noted that the electrode 5' does not extend above the upper limit of the well 9, thus the electrode is kept immersed in mercury when the lamp is tilted for starting, so that no iron is exposed to the action of the discharge, and spluttering thereby avoided.

It has been pointed out that the water jacket 6 completely surrounds the upper electrode chamber 4, in order that the mercury in the chamber be kept cool, and heating of the iron electrode avoided. This purpose is also accomplished in the case of the lower mercury chamber 2, however, in a slightly different manner. Note that chamber 2 is constricted at 8. This provides a small cross-section of mercury between the burner tube 1, wherein the arc occurs, and the main body of the reservoir 2. This permits of a quick flow of heat from the mercury to the water in 6, thus heating of the main body of mercury in 2 is avoided. Further, the constriction at 8 provides for the exposure of a large upper surface of the mercury in 2 to the water in jacket 6, thus even more effectively providing for the cooling of 2.

It is to be pointed out that the water jacket tube 6 is maintained concentric with the burner tube 1 throughout the entire length of the latter, the two being fused together, at the bottom through the seal with 2 and at the top through the supporting effect of the tube 7 and chamber 4. It will also be noted that either end of the water jacket tube 6 is straight and parallel with 1, for a short distance within the neighborhood of the electrode chambers and mercury wells of 1. Beyond this straight portion of 6 corrugations or undulations 12, 12' etc., set in and are maintained evenly throughout the remainder length of tube 6. It may also be pointed out that the upper periphery of the undulations, 12', lie in a plane parallel with the straight portion of 6, so that a further and outer tube may be fitted concentric with 6 without need of undue enlarging of said outer tube in order that it may slip over 6. It may also be noted that the upper electrode sleeve tube 7 is set back so as to be clear of the sides of 6. This is also carried out with the upper water outlet 6'', so that clear passage is presented for the removal of a close fitting tube, concentric with 6, by slipping same from the top. The cooling water inlet 6''', located at the bottom of 6 is set off at one side, it not being necessary to maintain this tube in the clear, since the outer tube is always slipped off from the top.

The construction of the lamp proper having been described it may be well to add that all parts hereinbefore described are made from clear, transparent fused quartz, so that a maximum transmission of ultra-violet may be obtained. We are now come to the outer tube 13, which, cooperating with the waterjacket tube 6, forms the treating chamber for accommodating the fluid to be irradiated. It will be noted that the diameter of the tube 13 is very slightly constricted at both ends so that a close but freely slipping fit is formed between the internal diameter of 13 and the outer diameter of 6. It will also be noted that the remainder of tube 13 is but slightly larger in internal diameter than the outer diameter of 6 so that a very narrow annulus is formed between the tube 13 and the outermost periphery of the undulations 12', this being no more than the matter of a millimetre or fraction thereof accordingly as desired for the nature of the fluid to be treated. Tube 13 is also provided with a somewhat enlarged section 13' near the lower end, and at two points, 180° apart and near the bottom of this enlarged section, are located inlet tubes 15'. The purpose of this enlarged section is to form a plenium for the supply of liquid or fluid to be irradiated, later to be described in more detail, in the operation of the apparatus. Near the upper end of 13 and opposite the enlarged annulus, formed by the undulation 12, two outlet tubes 15, spaced 180° apart, are located. When the tube 13 is slipped into place it is secured with elastic bands 14 and 14', these bands further serving to make a liquid tight junction between 13 and 6. Since tube 13 is not called upon to transmit ultra-violet it may be made from ordinary glass, metal, or any suitable material. This completes the description of the apparatus, and we will now concern ourselves with a description of its operation.

Let us assume that the lamp has been pumped out to a high degree of vacuum and filled with strictly pure mercury to a point somewhat above the top of the constricted throat 8, when the lamp stands in a vertical position. Let us also assume that the lamp has been suitably mounted on a cradle, secured with clips at the top and bottom, and that the cradle is pivoted at or near the center so that the lamp may be tilted through substantially 180°. The mounting also being such that when the lamp is tilted electrode 5' will always point straight downward. Let us further assume that suitable flexible connections have been made through a suitable switch between the electrodes 5 and 5' to a suitable source of direct current of proper potential. If we now tilt the lamp so that mercury flows from the bottom to the top of the burner tube, continuing the tilting until the upper electrode chamber 4 is filled with mercury, so that the mercury stands to a depth of three fourths of the depth of 4, below the upper edge of 1, when the lamp is in the vertical position. If the proper amount of mercury has been introduced into the lamp it will stand a few millimetres above the constriction 8, after the upper chamber 4 has ben properly filled and the lamp returned to its vertical position.

The switch in the electrode circuit is now closed and the lamp gently tilted towards the horizontal position, so that the mercury flows upwards in the direction of 4, tilting carefully so that the mercury stream is confined to the starting channel 3 (Figs. 1 and 2). When the mercury stream in 3 is fully formed between 2 and 4 so that metallic contact is established, a momentary short circuit obtains which vaporizes some mercury, due to the heat generated, and the atmosphere within the burner tube becomes conducting, and an arc flashes into being. At this point the lamp is quickly but evenly brought to its upright position. All of this has been accomplished with the jacket 6 drained of water. By the time the lamp is brought to its upright position the arc will have become stable, and then the water is immediately admitted to the jacket 6, the connections with the water supply and sewer should have previously been established through flexible connections. The intensity of the arc may now be regulated by a rheostat located in the electrode circuit, and when the arc is brought to the proper intensity, as best indicated by an ammeter in the electrode circuit, the lamp is ready to receive the fluid to be irradiated.

The fluid to be irradiated is admitted to the treating chamber, in the case of a liquid, at the bottom inlets 15', these inlets being connected together and supplied from a common point. In the case of a gas it is best to supply the treating chamber from the top, in which case the position of 13 is reversed. The outlets 15 are further brought together into one common outlet conduit, and lead to a suitable receiver for the treated fluid.

We must now deal with the character of flow of a liquid through the treating chamber. Let us assume that the liquid is admitted at the bottom enlarged section of 13, 13', through the tubes 15'. This enlarged section permits of free ingress of the liquid, and being admitted at two points ready junction between the two entering streams is formed within 13', and as the motion of the streams is substantially equal from either side ready and substantially even upward stream lines are induced, so that the character of flow from 13' into the treating chamber proper is substantially constant throughout the annulus, thus 13' functions as a supply plenium, for the "smoothing out" of the flow through the treating chamber.

Let us now consider the passage of the liquid throughout the length of the treating chamber. It will be noted that due to the undulatory character of 6 a tortuous path is provided through the treating chamber. As the liquid leaves the plenium 13' it passes in a very thin film between the tube 13 and the convex projection of 6. In the case of a liquid, such as milk, the radiations will not penetrate to a depth of more than 0.1 mm., and since the annulus forming the film is at least ten times this value, only about 10% of the milk is exposed for the short duration of the passage of the film past each convex projection of 6.

However the film next enters the portion of the treating chamber formed between tube 13 and the concave portion of 6. With the initial filling the milk here spreads out to fill this section of the chamber and in doing so an appreciable surface is exposed since it is subject to radiations from the side as well as from top and bottom, since quartz passes the radiations in all directions, and the quartz wall of 6 extends laterally into the milk body. In this way the surface available for irradiation is considerably increased over what would obtain in case of making tube 6 straight throughout and supplying the corrugations in tube 13. After the initial filling we have a condition as follows:

First the milk is subjected to radiations in thin films, formed by the annulus between 13 and the convex projection of 6. There is already a body of milk in the section immediately subsequent, and this body is receiving radiations over the surface of that portion of it that is in contact with 6. The stream entering from the bottom, tends to produce a swirl in the concave section, thus mixing the entering portion with the portion already in the concave section, and at the same time discharging a like amount of milk from the top of the concave section. This is effective in bringing a freshly irradiated surface of the milk into admixture with a body of milk that is not then being actually irradiated, thus such energy as the freshly irradiated surface can give off is immediately taken up by the body of milk in the concave section, and a maximum effective absorption is obtained. The swirl produced by the entering stream also serves to agitate the entire body of milk thus effectively stirring in the surface film being radiated at that instant, thus again effective absorption is obtained for a maximum of the surface being radiated at any one time.

This procedure is repeated throughout the length of the treating chamber, and it has been found that a more effective activation is thus obtained than would be the case when the same liquid is activated in an annulus of constant cross-section throughout, the same rate of discharge being maintained in both cases.

The term fluid, as used in these specifications is intended to comprehend both liquids and gases. It may also be pointed out that while the apparatus illustrated is a preferred embodiment of the invention, the use of the figures is for purpose of illustration only and is not to be construed as limiting the invention to one particular form of apparatus, but any equivalent may be employed without departing from the spirit of the invention. It is requested, therefore, that the invention be limited only insofar as prior art may bear on the appended claims.

Having thus described my invention, what I claim as new and desire to secure by Letters Patent is:

1. Apparatus for irradiating fluids relatively opaque to the wave lengths of radiated energy to be used which consists of a source of intense radiation of the said energy and a fluid passage encircling said source having alternate thick and thin portions running crosswise of the passage, said thick and thin portions being uniformly spaced along said source.

2. Apparatus for irradiating fluids relatively opaque to the wave lengths of radiated energy to be used which consists of a source of intense radiation of the said energy and a fluid passage encircling said source having alternate thick and thin portions running crosswise of the passage, said apparatus having a cooling liquid passage interposed between said source and the fluid passage said cooling liquid passage being thin where the fluid passage is thick and thick where the fluid passage is thin.

3. Apparatus for irradiating fluids relatively opaque to ultra-violet radiation comprising in combination a mercury-arc tube of quartz, a cooling liquid jacket encircling said tube and a passage for the fluids to be irradiated encircling the cooling liquid jacket said passage having annular constrictions spaced longitudinally of the tube said constrictions being of substantially equal cross section.

4. Apparatus for irradiating fluids relatively opaque to ultra-violet radiation comprising in combination a mercury-arc tube of quartz, a cooling liquid jacket encircling said tube and a passage for the fluids to be irradiated encircling the cooling liquid jacket said passage having one wall being provided with a plurality of uniformly spaced annular undulations to produce spaced annular constrictions in said passage.

5. Apparatus for irradiating fluids relatively opaque to ultra-violet radiation comprising in combination a mercury-arc tube of quartz, a cooling liquid jacket encircling said tube and a passage for the fluids to be irradiated encircling the cooling liquid jacket said passage having a plurality of duplicate annular constrictions spaced longitudinally of the tube the outer wall of said passage being removable.

6. Apparatus for irradiating fluids relatively opaque to ultra-violet radiation comprising in combination a mercury-arc tube of quartz, a cooling liquid jacket encircling said tube and a passage for the fluids to be irradiated encircling the cooling liquid jacket said passage having the inner wall provided with a plurality of uniformly spaced annular undulations to produce spaced annular constrictions in said passage.

7. Apparatus for irradiating milk comprising an elongated source of ultra-violet radiation, a quartz tube enclosing said source, and a passage for said milk encircling the source said passage having a quartz inner wall and said passage also having annular constrictions of substantially equal dimensions and like configuration spaced longitudinally of said source.

8. Means for repeatedly mixing and exposing the several portions of a relatively opaque liquid stream to a source of radiation comprising an elongated source of radiation, means providing an elongated liquid passage surrounding said source, said passage having a multiplicity of alternate restrictions and enlargements running transversely of the direction of flow whereby to repeatedly and alternately subject the liquid to exposure in a thin film and to mixing in a relatively thick chamber where it is also exposed to the source of radiation.

9. Means for repeatedly mixing and exposing the several portions of a relatively opaque liquid stream to a source of radiation comprising an elongated source of radiation, means providing an elongated liquid passage surrounding said source, said means including a wall of said passage and having a multiplicity of undulations running transversely of said passage between the ends of said source of radiation, said undulations being substantially duplicates whereby to repeatedly and alternately subject the liquid to exposure in a thin film and to mixing in a relatively thick chamber.

10. Means for repeatedly mixing and exposing the several portions of a relatively opaque liquid stream to a source of radiation comprising an elongated source of radiation, means providing an elongated liquid passage surrounding said source, said means including a wall of said passage having a multiplicity of undulations running transversely of said passage between the ends of said source of radiation, said undulations being substantially duplicates whereby to repeatedly and alternately subject the liquid to exposure in a thin film and to mixing in a relatively thick chamber, the walls of said passage at the narrowest points being separated a distance in excess of the distance to which the radiations from said source will penetrate said liquid.

11. Means for repeatedly mixing and exposing the several portions of a relatively opaque liquid stream to a source of radiation comprising an elongated source of radiation, means providing an elongated liquid passage surrounding said source, said means including a wall of said passage having a multiplicity of undulations running transversely of said passage between the ends of said source of radiation, said undulations being substantially equally spaced throughout their extent between the ends of said source whereby to repeatedly and alternatily subject the liquid to exposure in a thin film and to mixing in a relatively thick chamber.

FRANK E. HARTMAN.